United States Patent [19]
Estelle

[11] Patent Number: 4,948,239
[45] Date of Patent: Aug. 14, 1990

[54] ZOOM LENS
[75] Inventor: Lee R. Estelle, Rochester, N.Y.
[73] Assignee: Eastman Kodak Company, Rochester, N.Y.
[21] Appl. No.: 367,910
[22] Filed: Jun. 19, 1989
[51] Int. Cl.[5] .................. G02B 15/14; G02B 9/64
[52] U.S. Cl. .......................... 350/470; 350/427
[58] Field of Search ........................ 350/427, 470

[56] References Cited
U.S. PATENT DOCUMENTS

| | | | |
|---|---|---|---|
| 4,281,906 | 8/1981 | Tanaka | 350/427 |
| 4,390,248 | 6/1983 | Ikemori | 350/427 |
| 4,518,228 | 5/1985 | Sugiura | 350/427 |
| 4,572,620 | 2/1986 | Kikuchi | 350/427 |
| 4,749,267 | 6/1988 | Mihara | 350/427 |
| 4,770,510 | 9/1988 | Mukaiya | 350/427 |
| 4,812,024 | 3/1989 | Makaiya | 350/427 |

Primary Examiner—Bruce Y. Arnold
Assistant Examiner—Rebecca D. Gass
Attorney, Agent, or Firm—Leonard W. Treash

[57] ABSTRACT

Zoom lenses having sequentially from the front a positive unit facing the long conjugate and consisting of a cemented doublet followed by a single element; a negative unit movable for zooming and consisting of a negative element and a negative doublet concave toward each other; a second negative unit movable for zooming and consisting of a single component including at least one negative element; and a stationary rear unit comprising a petzval-type lens group. The zoom lens has a zoom range greater than 5×, a total coverage exceeding 48° at some zoom position and an f-number is f-1.48.

10 Claims, 1 Drawing Sheet

ZOOM LENS

BACKGROUND OF THE INVENTION

1. Field of the Invention

This invention relates to zoom lenses for photographic purposes, more particularly, but not exclusively, for video movie cameras.

2. Prior Art

U.S. Pat. Specification No. 4,749,267, discloses a zoom lens including twelve elements arranged in four optical units. There is a positive unit facing the long conjugate and movable for focussing. There is a negative unit movable for zooming. There is a second negative unit which is movable for zooming and there is a rear unit which is stationary. The positive unit facing the long conjugate consists of a cemented doublet followed by a single element. The negative unit consists of a negative element and a negative doublet concave towards each other. The second negative unit consists of a single component including one negative element. The fourth unit consists of a front sub-unit and a rear sub-unit, wherein the front sub-unit consists of two positive lens elements followed by a negative lens element and the rear sub-unit consists of either one or two positive lens elements. This zoom lens has a zoom range of only 3 X and a f-number of about f/2.0.

There have been several proposals for zoom lenses in which the first three units are similar to those of U.S. Pat. No. 4,749,267, but which use different rear units. For example, in U.S. Pat. No. 4,572,620 the rear unit includes eight elements. The zoom lens of U.S. Pat. No. 4,572,620 has a zoom range of 5.6 and a f-number of about f/1.4.

U.S. Pat. No. 4,281,906, also shows a 4-unit zoom lens with a front positive unit for focussing action followed by two negative zooming units and a positive stationary rear unit. However, this zoom lens consists of 17 to 20 lens elements, with the last 7 to 10 elements comprising the Positive rear unit. That known lens has a zoom ratio of 12.65 with an f-number of f/1.6.

It is an object of the present invention to provide a zoom lens having, in combination, a higher zoom ratio, superior f-number and fewer elements than the zoom lenses of the prior art.

SUMMARY OF THE INVENTION

The present invention provides a zoom lens of the general type described above, having a high zoom ratio and a large aperture diameter, by using a rear unit of lens elements which consists of a fixed positive lens component, an aperture stop and a PETZVAL lens group. A PETZVAL lens consists of two positive doublets, separated from each other by a relatively large airspace, so that the separation between these doublets is larger than the largest air separation between a positive and a negative lens element constituting a doublet. Advantageously, an element in the rear unit has an aspheric surface.

In embodiments wherein the aspheric surface is a concave surface, the aspheric deformation terms may cause the sag to be less in absolute value than the absolute value of the sag determined by the base curve at the maximum clear aperture.

In embodiments wherein the aspheric surface is a convex surface, the aspheric deformation terms may cause the sag to be greater in absolute value than the absolute value of the sag determined by the base curve at the maximum clear aperture.

Advantageously, in some embodiments of the invention, the distance from the front vertex to the image plane is less than twice the maximum focal length of the lens.

In other advantageous embodiments of the present invention, the clear aperture of the front element of the lens is less than 60% of the maximum focal length of the lens, and the relative illumination is 36% or greater at both the maximum and the minimum focal length. This condition can be achieved by increasing the vignetting (V) of the lens and hence reducing the Relative Illumination (R.I.) of the lens.

Relative Illumination is defined as:

$$R.I. = (1 - V) \times \cos^4 \theta$$

wherein $\theta$ is the exiting angle that the principle ray makes with the optical axis and the vignetting is defined as the absolute value of the difference between the area of the axial exit pupil determined by the axial bundle, and the area of the off axis exit pupil determined by the maximum obliquity, divided by the area of the axial exit pupil. The axial exit pupil is the image of the stop created by all the elements succeeding the stop. The area of the off axis exit pupil is limited by the lens diameters. The axial exit pupil area of the axial beam is assumed to be computed when the lens is at its fastest f-number.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENT

Figure 1:
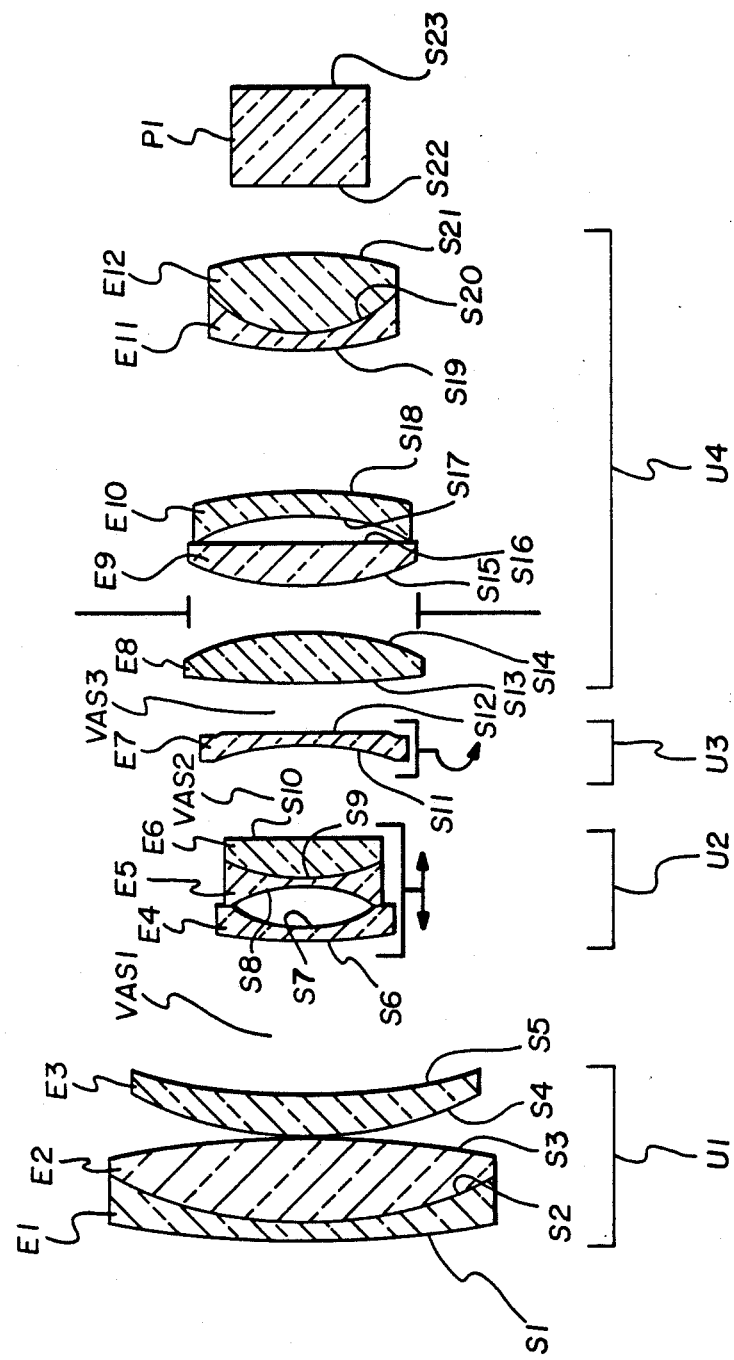
FIG. 1 is a diagram of a first illustrative embodiment of the present invention.

All linear dimensions in this Specification are millimeters unless specified otherwise.

FIG. 1 illustrates a first embodiment of the present invention in the form of a zoom lens having a 6 to 1 zoom ratio and intended to be used as the taking lens in a video movie camera. The lens includes twelve lens elements E1 to E12 arranged in four units U1 to U4. The first and fourth units, U1 and U4 respectively, are stationary for a fixed object distance and the second and third, U2 and U3, respectively, move for zooming. The first unit U1 moves for focussing. Thus, there are variable air spaces VAS1, VAS2 and VAS3 between the first and second units U1 and U2, the second and third units U2 and U3, and the third and fourth units U3 and U4, respectively. Behind the lens element E12 there is a plano element P1 which is representative of planos which are present at this location for anti-aliasing purpose or they may be, for example, prism blocks. Such elements, while having no power, do affect the aberrations, and hence the lens is designed taking into account the optical effects of the representative plano P1. In all the embodiments herein disclosed, the representative planos are designed with a representative thickness of 7.5 and a refractive index of 1.517 and in all the embodiments they are located behind the last lens element.

The first and second lens elements E1 and E2 are in the form of a positive cemented doublet; the element E1 being a negative meniscus and the lens element E2 being biconvex. The third lens element E3 of the first unit U1 is a positive meniscus.

The second unit U2 includes a first lens element E4, which is meniscus. The second and third lens elements E5 and E6 of the second unit U2 are formed as a negative cemented doublet; the lens element E5 being biconcave and the lens element E6 being positive biconvex.

The third unit U3 includes a negative meniscus lens element E7.

The fourth unit U4 includes an aperture stop and comprises five lens elements, the last four of those arranged into a petzval-type lens group. The fourth unit U4 includes an element E8 which is biconvex; element E9 which is a positive meniscus; element E10 which is a negative meniscus; and lens elements E11 and E12 which form a positive cemented doublet, the element E11 being a negative meniscus and the element E12 being biconvex. Elements E9, E10, E11 and E12 form a petzval-type lens group, i.e., elements E9 and E10 form the first positive doublet, and elements E11 and E12 form the second positive doublet and there is a relatively large air separation between these doublets. The front surface S19 of the meniscus element E11 is aspheric. The aspheric equation is:

$$X = \frac{CY^2}{1 + \sqrt{1 - (K+1)C^2Y^2}} + DY^4 + EY^6$$

The values of the terms C, D, E, and K for surface S19 are:

| | |
|---|---|
| C = | .05284798 |
| D = | −.39948E-4 |
| K = | 1.8 |
| E = | 0.17405E-08 |
| VERTEX RADIUS = | 18.9222 |

Table 1, below, which gives various parameters of the lens illustrated in FIG. 1, including the radii of the surfaces S1 to S23 of the elements E1 to E12 and of the plano P1. As is conventional, the two contiguous surfaces of a cemented doublet are given the same reference symbol, e.g. S2.

| SURFACE | RADIUS | THICKNESS | REFRACTIVE INDEX | Abbe V NUMBER |
|---|---|---|---|---|
| S1 | 78.1020 | 1.500 | 1.805 | 25.5 |
| S2 | 30.4150 | 6.100 | 1.603 | 60.7 |
| S3 | −78.6180 | 0.100 | | |
| S4 | 22.5640 | 3.600 | 1.603 | 60.7 |
| S5 | 47.4730 | VAS 1 | | |
| S6 | 35.6080 | 0.900 | 1.786 | 43.9 |
| S7 | 10.4800 | 2.970 | | |
| S8 | −12.3020 | 0.900 | 1.713 | 53.9 |
| S9 | 12.3020 | 3.000 | 1.805 | 25.5 |
| S10 | −619.498 | VAS 2 | | |
| S11 | −19.6320 | 0.800 | 1.541 | 47.2 |
| S12 | −282.540 | VAS 3 | | |
| S13 | 61.1950 | 3.800 | 1.713 | 53.9 |
| S14 | 21.0530 | 1.500 | | |
| | DIAPHRAGM | 2.250 | | |
| S15 | 23.6368 | 3.100 | 1.713 | 53.9 |
| S16 | 1089.80 | 2.160 | | |
| S17 | −18.3400 | 1.900 | 1.847 | 23.8 |
| S18 | −30.9168 | 10.664 | | |
| S19 | ASPHERE | 1.480 | 1.844 | 23.8 |
| S20 | 8.8262 | 6.040 | 1.548 | 45.8 |
| S21 | −21.9548 | 5.000 | | |
| S22 | PLANO | 7.500 | 1.517 | 64.2 |

-continued

| SURFACE | RADIUS | THICKNESS | REFRACTIVE INDEX | Abbe V NUMBER |
|---|---|---|---|---|
| S23 | PLANO | 16.2 | | |

Table 2, below, gives further parameters for the lens illustrated in FIG. 1.

| EFFECTIVE FOCAL LENGTH | LENGTH OF | | |
|---|---|---|---|
| | VAS 1 | VAS 2 | VAS 3 |
| 9.55 | 1.092 | 21.125 | 0.920 |
| 21.71 | 11.988 | 7.257 | 3.892 |
| 54.07 | 19.252 | 3.016 | 0.869 |

The effective focal length of the lens illustrated in FIG. 1 ranges from 9.55 to 54.08. Thus the zoom ratio is 5.7 to 1 which, by customary standards, qualifies the lens to be termed a 6 to 1 zoom lens. The f-number of the lens varies from 1.48 to 1.90 through the zoom range. The values given in Table 2 for the back focal length are calculated for air between the rear element E12 and the image plane. The physical distance, with the plano element P1 present, would be different. The maximum focal length of the lens is 54.08. It will be observed that the distance from the front vertex to the image plane (i.e., the lens length plus the back focal length) is 92.11 and that this is at most 1.70 times the maximum focal length of the lens.

The semi-field angle of the lens illustrated in FIG. 1 varies from 23.81° to 4.08° through the zoom range; thus, the total coverage of the lens, at the extreme wide angle condition, is 47.62°.

The front clear aperture is 30.0 which is 55.5% of the maximum focal length and the Relative Illumination is 36% and 37% for the minimum or maximum focal lengths, respectively.

An alternate embodiment of the present invention in the form of a zoom lens having a 6 to 1 zoom ratio and again intended to be used as the taking lens in a video movie camera, is very similar to that described above, except for those differences shown in Table 3 below:

| SURFACE | RADIUS | THICKNESS | REFRACTIVE INDEX | Abbe V NUMBER |
|---|---|---|---|---|
| S1 | 78.1020 | 1.500 | 1.805 | 25.5 |
| S2 | 30.4150 | 6.100 | 1.603 | 60.7 |
| S3 | −78.6180 | 0.100 | | |
| S4 | 22.5640 | 3.600 | 1.603 | 60.7 |
| S5 | 47.4730 | VAS 1 | | |
| S6 | 35.6080 | 0.900 | 1.786 | 43.9 |
| S7 | 10.4800 | 2.970 | | |
| S8 | −12.3020 | 0.900 | 1.713 | 53.9 |
| S9 | 12.3020 | 3.000 | 1.805 | 25.5 |
| S10 | −619.498 | VAS 2 | | |
| S11 | −19.6320 | 0.800 | 1.541 | 47.2 |
| S12 | −282.540 | VAS 3 | | |
| S13 | 61.1950 | 3.800 | 1.713 | 53.9 |
| S14 | 21.0530 | 1.500 | | |
| | DIAPHRAGM | 2.250 | | |
| S15 | 23.6368 | 3.100 | 1.713 | 53.9 |
| S16 | 1089.80 | 2.160 | | |
| S17 | −18.3400 | 1.900 | 1.847 | 23.8 |
| S18 | −30.9168 | 10.664 | | |
| S19 | ASPHERE | 1.480 | 1.844 | 23.8 |
| S20 | 8.8262 | 6.040 | 1.546 | 45.8 |
| S21 | −21.5958 | 5.000 | | |
| S22 | PLANO | 7.500 | 1.517 | 64.2 |

-continued

| SURFACE | RADIUS | THICKNESS | REFRACTIVE INDEX | Abbe V NUMBER |
|---|---|---|---|---|
| S23 | PLANO | 16.2 | | |

It will be observed that in each embodiment the aspheric deformation terms cause the sag to be greater in absolute value than the absolute value of the sag determined by the base curve at the maximum clear aperture.

Those skilled in the art will recognize that while the aspheric surfaces listed are all on convex surfaces, the aspheric surface could be a concave surface and in such embodiments the aspheric deformation terms cause the sag to be less in absolute value than the absolute value of the sag determined by the base curve at the maximum clear aperture.

The invention has been described in detail with particular reference to a presently preferred embodiment, but it will be understood that variations and modifications can be effected within the spirit and scope of the invention.

What is claimed is:

1. A zoom lens comprising:
   at least ten elements arranged in four units including from front-to-rear:
   a first positive unit facing the long conjugate and movable for focussing, said positive unit consisting of a cemented doublet followed by a single element;
   a first negative unit movable for zooming, said negative unit consisting of a negative element and a negative doublet concave toward each other;
   a second negative unit movable for zooming, said second negative unit consisting of a single negative lens component; and
   a second positive stationary unit at the end of said zoom lens facing the short conjugate, said second unit consisting of a fixed positive lens component, an aperture stop and a PETZVAL lens.

2. A zoom lens as claimed in claim 1, having the following characteristics:

| SURFACE | RADIUS | THICKNESS | REFRACTIVE INDEX | Abbe V NUMBER |
|---|---|---|---|---|
| S1 | 78.1020 | 1.500 | 1.805 | 25.5 |
| S2 | 30.4150 | 6.100 | 1.603 | 60.7 |
| S3 | −78.6180 | 0.100 | | |
| S4 | 22.5640 | 3.600 | 1.603 | 60.7 |
| S5 | 47.4730 | VAS 1 | | |
| S6 | 35.6080 | 0.900 | 1.786 | 43.9 |
| S7 | 10.4800 | 2.970 | | |
| S8 | −12.3020 | 0.900 | 1.713 | 53.9 |
| S9 | 12.3020 | 3.000 | 1.805 | 25.5 |
| S10 | −619.498 | VAS 2 | | |
| S11 | −19.6320 | 0.800 | 1.541 | 47.2 |
| S12 | −282.540 | VAS 3 | | |
| S13 | 61.1950 | 3.800 | 1.713 | 53.9 |
| S14 | 21.0530 | 1.500 | | |
| | DIAPHRAGM | 2.250 | | |
| S15 | 23.6368 | 3.100 | 1.713 | 53.9 |
| S16 | 1089.80 | 2.160 | | |
| S17 | −18.3400 | 1.900 | 1.847 | 23.8 |
| S18 | −30.9168 | 10.664 | | |
| S19 | ASPHERE | 1.480 | 1.844 | 23.8 |
| S20 | 8.8262 | 6.040 | 1.548 | 45.8 |
| S21 | −21.9548 | 5.000 | | |
| S22 | PLANO | 7.500 | 1.517 | 64.2 |

-continued

| SURFACE | RADIUS | THICKNESS | REFRACTIVE INDEX | Abbe V NUMBER |
|---|---|---|---|---|
| S23 | PLANO | | | | and the values of the variable airspaces VAS1, VAS2, and VAS3 for each of the three effective focal lengths specified are:

| EFFECTIVE FOCAL LENGTH | LENGTH OF | | |
|---|---|---|---|
| | VAS 1 | VAS 2 | VAS 3 |
| 9.55 | 1.092 | 21.125 | 0.920 |
| 21.71 | 11.988 | 7.257 | 3.892 |
| 54.07 | 19.252 | 3.016 | 0.869 | and the aspheric surface is in accordance with the equation:

$$X = \frac{CY^2}{1 + \sqrt{1 - (K + 1)C^2 Y^2}} + DY^4 + EY^6$$

with the values of the terms C, D, E and K for surface S19 being:

| | |
|---|---|
| C = | 0.052848 |
| D = | $-0.3994771^{-4}$ |
| K = | 1.80000 |
| E = | $0.1740459^{-8}$ |
| and the VERTEX RADIUS = | 18.9222. |

3. A zoom lens comprising:
   at least ten elements arranged in four units including from front-to-rear:
   a first positive unit facing the long conjugate and movable for focussing, said positive unit consisting of a cemented doublet followed by a single element;
   a first negative unit movable for zooming, said negative unit consisting of a negative element and a negative doublet concave toward each other;
   a second negative unit movable for zooming, said second negative unit consisting of a single negative lens component; and
   a second positive stationary unit at the end of said zoom lens facing the short conjugate, said second unit consisting, from front-to-rear, of a positive lens component, an aperture stop, a first doublet having lens elements of opposite power and a second doublet having lens elements of opposite power and, separated from said first doublet by an airspace, said airspace being larger than the largest separation between lens elements constituting either of said doublets.

4. A zoom lens as claimed in claim 1 or 3, wherein an element in said rear unit has an aspheric surface.

5. A zoom lens as claimed in claim 4, wherein said aspheric surface is a concave surface the sag of which is less in absolute value than the absolute value of the sag determined by the base curve at the maximum clear aperture.

6. A zoom lens as claimed in claim 4, wherein the aspheric surface is a convex surface and the sag of which is greater in absolute value than the absolute value of the sag determined by the base curve at the maximum clear aperture.

7. A zoom lens as claimed in claim 4, wherein the distance from the front vertex to the image plane is less than twice the maximum focal length of the lens.

8. A zoom lens as claimed in claim 4, wherein the clear aperture of the front element of the lens is less than 60% of the maximum focal length of the lens and the relative illumination is 36%, or greater, at both the maximum and the minimum focal lengths.

9. A zoom lens as claimed in claims 1 or 3, wherein the distance from the front vertex to the image plane is less than twice the maximum focal length of the lens.

10. A zoom lens as claimed in any one of claims 1 or 3, wherein the clear aperture of the front element of the lens is less than 60% of the maximum focal length of the lens and the relative illumination is 36%, or greater, at both the maximum and the minimum focal length.

* * * * *